United States Patent
Bakshi et al.

(10) Patent No.: US 6,373,932 B2
(45) Date of Patent: Apr. 16, 2002

(54) CONFIGURATION TRACKING SYSTEM

(75) Inventors: Kapildeep Singh Bakshi, Herndon, VA (US); Aletha Lynn Barnes, Silver Spring, MD (US); Randolph Alexander Krenz, Ellicott City, MD (US); Alamu Chockalingam, Gaithersberg, MD (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/303,882

(22) Filed: May 3, 1999

(51) Int. Cl.[7] .............................................. H04M 15/00
(52) U.S. Cl. ............. 379/126; 379/112.01; 379/114.01; 379/133; 379/134
(58) Field of Search ................. 379/111–115, 133–134, 379/116–119, 126, 114.01, 114.03, 114.14, 112.01, 115.01

(56) References Cited

U.S. PATENT DOCUMENTS 5,218,632 A  * 6/1993 Cool ........................... 379/126
5,734,705 A  * 3/1998 Schlossman et al. ....... 379/117

* cited by examiner

Primary Examiner—Duc Nguyen

(57) ABSTRACT

A configuration tracking system for a call detail record (CDR) filtering system keeps track of the contexts under which CDRs are collected and filtered. The configuration tracking system is useful in a multiple concurrent filtering paradigm, in which several CDR filters may be active at any given time and the filter criteria are dynamically altered. Filter criteria for multiple filters are recorded in a dynamically changing table. The configuration tracking system maintains a historical record of the filter criteria in the dynamically changing table. The configuration tracking system updates its historical record by detecting changes in the dynamically changing filter table, comparing earlier and later versions of the table, and opening and/or closing timestamped filter records in response.

20 Claims, 5 Drawing Sheets

LINK LOOK-UP TABLE

| Monitoring Point Code | Remote Point Code | Link Number | Start Time | Stop Time |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

205 — Monitoring Point Code
210 — Remote Point Code
215 — Link Number
220 — Start Time
230 — Stop Time
200 — (table)

Fig. 2

FILTER TABLE

| Class ID. | Filter Definitions |
|---|---|
| | |
| | |
| | |
| | |
| | |
| | |
| | |
| | |
| | |
| | |
| | |
| | |
| | |
| | |

Fig. 3

STUDY TABLE

| Study ID (405) | Filter Definition (310) | Class ID (305) | Start Time (410) | Stop Time (415) |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| . | | | | |
| . | | | | |
| . | | | | |
| X | | | | |

CONFIGURATION TRACKING SYSTEM

TECHNICAL FIELD

The invention relates to monitoring call traffic associated with public switched telephone networks. In particular, the invention relates to monitoring and collecting call detail records that satisfy specified filter criteria.

BACKGROUND

There is tremendous business value associated with monitoring the call traffic associated with public switched telephone networks (PSTN). For example, having knowledge of who called whom, and for how long, may be of tremendous benefit to PSTN designers who are trying to maximize the return on capital investments in the PSTN or reduce quality of service issues in a particular geography. Similarly, marketers may be interested in identifying target markets, for new products or services based on the calling patterns of an individual. With the advent of deregulation in the telecommunications industry, accurate measures of call volumes traversing competing PSTN networks can have immediate and substantial financial effects on reciprocal compensation which typically flows between incumbent local exchange carriers and competitive local exchange carriers.

The monitoring of call traffic associated with a PSTN is typically achieved by collecting call detail records (CDRs). A single CDR contains some or all information known about a particular phone call, such as who called whom, when, for how long, etc. CDRs also may contain more technical information such as what route a call took through a PSTN network.

An inherent problem with filtering CDRs is maintaining the context under which a CDR was collected. For example, in the case of a single CDR filtering paradigm, suppose a filter criteria was specified that would limit CDR collection to all calls to or from a particular residential phone number. In the course of a day, only a few CDRs would be generated. Next, suppose a CDR processing application is run against this data and the nature of the CDR processing application is to determine how busy (volume of phone calls) the PSTN network is. In this example, the CDR processing application would conclude that the PSTN network is not busy at all, only a few calls occurred on the entire network. The reality is however that the CDR processing application did not understand the context under which the CDR data was collected, and derived incorrect conclusions as a result. This problem becomes more complex in the case of multiple, concurrent filter paradigms because the colleted set of CDRs is actually the union of smaller sets of CDRs, each smaller set being associated with a particular filter criteria. In this case, a CDR processing application must understand which, of several possible contexts, are associated with each individual CDR.

SUMMARY OF INVENTION

This invention is directed to a configuration tracking system for a call detail record (CDR) filtering system. Filter criteria for multiple filters are recorded in a dynamically changing Filter Table. The configuration tracking system maintains a Study Table, which is a historical record of the filter criteria in the dynamically changing Filter Table. The configuration tracking system updates the Study Table by detecting changes in the Filter Table, comparing earlier and later versions of the Filter Table, and, in response, opening and/or closing timestamped records in the Study Table.

Various embodiments of the present invention are capable of keeping track of the contexts under which CDRs are collected and filtered in a multiple concurrent filtering paradigm Other features and advantages of the invention will be apparent from the accompanying drawings and the detailed description that follows.

BRIEF DESCRIPTION OF DRAWINGS

The invention will be described with reference to the following drawings, wherein like numerals refer to like objects and wherein:

FIG. 2 is a link look-up table located in a data manager;

FIG. 3 is a filter table located in a signaling link monitoring system;

FIG. 4 is a study table located in the data manager; and

DETAILED DESCRIPTION OF PREFERRED EMBODIMENT

Figure 1:
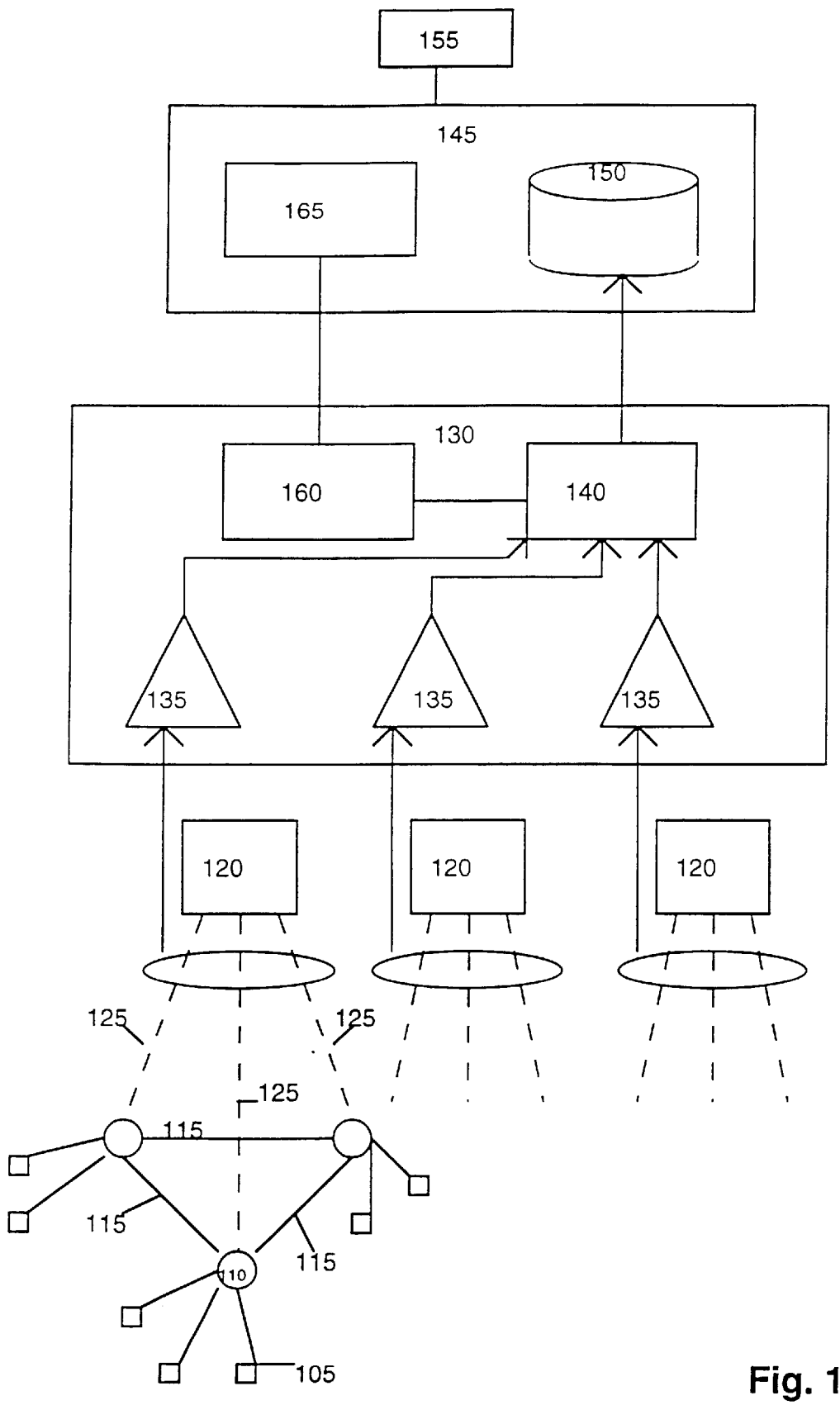
FIG. 1 is a block diagram of a preferred embodiment of the present invention and its environment.

FIG. 1 depicts a system 100 according to the present invention. The system 100 encompasses at least a part of the public switched telephone network (PSTN). A telephony network is illustrated at the bottom of FIG. 1, where, for example, a phone 105 is linked to a local exchange or switch 110, which is interconnected to other switches that connect to other phones. Although the phone 105 is assumed in this description to be a telephone, it could be a modem, computer, private branch exchange (PBX) or any other end point telephony equipment. Many phones can be connected to a single switch, and each switch is typically located near the geographical center of the area it serves. In the case of an intra-switch call between two phones connected to the same switch 110, the switch 110 manages all aspects of the phone call. In the case of an inter-switch call between two phones connected to different switches, the call is transferred on one or more trunks 115 linking the switches. If there is a direct trunk between two switches, it may be utilized to connect the inter-switch call. However, it is sometimes necessary to connect a call through intermediary switches, in which case two or more trunks 115 are utilized. In either case, some degree of inter-switch coordination is necessary to establish, maintain, and disconnect an inter-switch call.

Inter-switch coordination in system 100 is accomplished using a signaling network. The term "signaling" in this sense refers to the communication of information about a call, not the underlying information that is the call itself. A signaling network, such as a signaling system 7 (SS7) network, overlays the telephony network and provides communication capabilities among switches so that inter-switch calls can be established, maintained, monitored, and disconnected in an orderly manner. In this way, only the underlying voice or data being communicated between two phones is transported on the trunks 115. That is, the SS7 network provides out-of-band signaling. The SS7 network includes several signal transfer points (STPs) 120, each of which is connected to at least one switch via a signaling link 125.

FIG. 1 illustrates a signaling link monitoring system 130 that collects information about call traffic in the PSTN by monitoring the signaling network. In particular, the link monitoring system 130 contains several probes 135 that detect and read data on the signaling links 125. Because switches always communicate signaling information through an STP 120 via one or more signaling links 125, rather than directly between switches, the probes 135 are able to detect and read all signaling data relating to inter-switch calls. Each probe 135 synthesizes, on the basis of the signaling data it intercepts, a call detail record (CDR) for every inter-switch call. A CDR contains various information regarding a call, such as, for example, calling number, called number, start time, stop time, route, etc. One skilled in the art would readily appreciate that various other technical information may or may not be included in a CDR.

Because the number of CDRs is very large, it is necessary or at least desirable to limit the number of CDRs that are ultimately stored. Therefore, CDR filtering is performed. The SS7 link monitoring system 130 provides multiple concurrent filters in a filter bank 140, which includes up to N active filter masks or filter criteria. In a preferred embodiment, such as Hewlett-Packard's AcceSS7 (TM) signaling link monitoring system, N is 64. All of the CDRs collected by the probes 135 are passed through the N filters and only those CDRs meeting at least one filter criteria are output from filter bank 140 and passed along to a data manager 145, where the CDRs are stored in a CDR database 150. CDRs not meeting any active filter criteria are simply discarded.

The definitions of the N filter criteria are maintained by a filter manager 160. In a preferred embodiment, the filter criteria definitions are recorded in a table, which is described in greater detail below. The filter criteria definitions can be changed as needs dictate. Thus, the filters are dynamic. The configuration tracking module 165 keeps track of changing filter configurations, as described in greater detail below. Generally, the configuration tracking module 165 creates and maintains a historical record of the filter criteria definitions in the filter manager 160.

The CDRs stored in the CDR database 150 can be accessed by an application program 155. The application program 155 can also access the configuration tracking records developed by the configuration tracking module 165 in order to determine the context under wich a particular CDR was collected (i.e., which filter mask(s) triggered the CDR to be kept). In this way, more meaningful results can be obtained by the application program 155.

The configuration tracking module 165 separates what is being monitored by the link monitoring system 130 into two distinct categories. The two categories being monitored are a network link configuration and a filter criteria configuration. The configuration tracking module 165 monitors all the changes made to these two areas of configurations.

Information obtained from the network link configuration is stored in a Link Lookup Table 200 as shown in FIG. 2. The Link Lookup Table 200 is a time-based tracking system and stores only monitored links. A monitored link can be retrieved by a user only if the date/time of the network configuration is known. Thus, the Link Lookup Table 200 keeps track of the monitoring point code 205, the remote point code 210, the link number 215 and the start time 220 and stop time 225 of the monitored links. Additional information can also be tracked by the configuration tracking module 165.

The monitored point code 205 identifies the STP 120 to which the signaling link is connected. The remote point code 210 identifies the switch 110 to which the signaling link is connected. By knowing the STP and switch that is being monitored, a user can find out which signaling link or set of related signaling links was being used to obtain the CDRs. The link number 215 identifies a particular link or subchannel among a set of related signaling links and is useful when several links connect a given switch to a given STP. The start time 220 and stop time 225 indicate when a particular signaling link was being monitored. The Link Lookup Table 200 is stored in the data manager 145 and is generated on the basis of information from the signaling link monitoring system 130 as to which links are being probed by the probes 135 and when.

Figure 3:
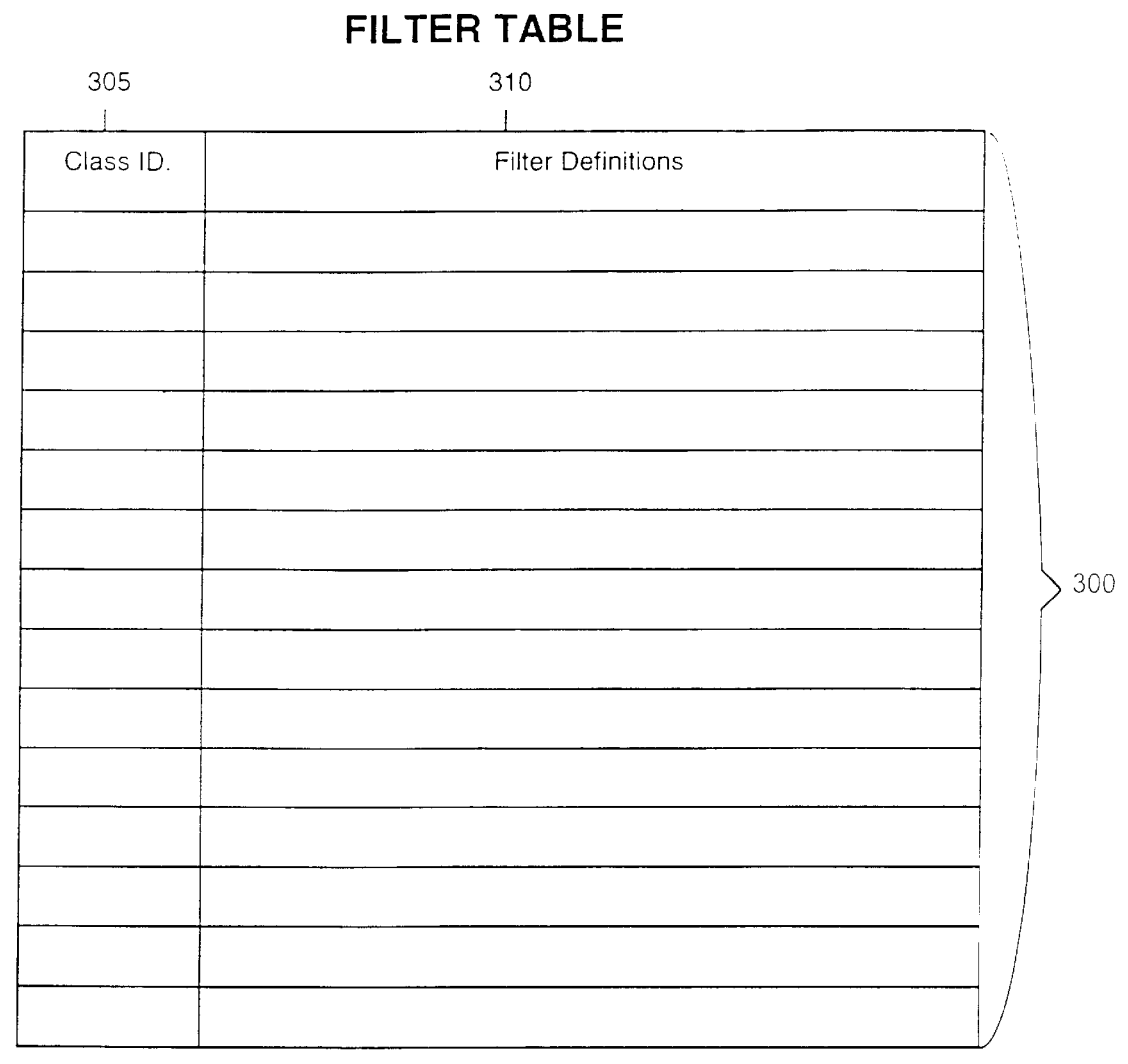

The filter criteria configuration is stored in a Filter Table 300 (FIG. 3) and a Study Table 400 (FIG. 4). Referring to FIG. 3, the filter criteria configuration is based on the notion of a class ID 305 in the signaling link monitoring system 130. A class is a logical grouping of filter criteria 310 to which a CDR belongs. Thus, as shown in FIG. 3, the Filter Table 300 contains the class ID 305 and all the relevant filter criteria 310 that go with that particular class ID 305. Each filter criteria 310 is identified by a filter identifier number known as a class ID 305 which can range from 0 to N. At any time, a signaling link monitoring system user can change the filter criteria 310 associated with a particular class ID 305. As a result, identifying CDRs with a class ID 305 is not sufficient to define the context of the CDR, since the filter criteria 310 associated with a given class ID 305 can be constantly changing.

FIG. 4 illustrates a Study Table 400 that contains information regarding every filter criteria 310. In particular, the Study Table 400 keeps track of every filter criteria 310 created over a period of time. Every time a filter criteria definition 310 is opened in the filter manager 160, a new study ID 405 is generated. This study ID 405 uniquely identifies that particular filter criteria 310 and can be used to tag CDRs which fall in this filter criteria 310. A study ID 405, as defined by the configuration tracking module 165, is a unique number, which relates to a particular class ID 305, over a period of time for which the filter criteria 310 associated with the class ID 305 is constant. As a result, identifying CDRs with a study ID 405 is sufficient to define the context of the CDR. In addition, a start time 410 and a stop time 415 are stored for a particular study ID 405. Thus any time the data manager 145 sees a new class ID 305 for which the filter criteria 310 have been changed, the data manager 145 allocates a new study ID 405. The Study Table 400 stores the new class IDs 305 and mapped study IDs 405, along with the start time 410 and the stop time 415 of the particular study ID 405.

In one mode, the equivalence relation to study ID 405 and class ID 305 is used during the load process of the data manager 145 to tag each CDR with a study ID 405. Using the study ID 405 as a key, the application program 155 can process only those CDRs that are relevant to the application 155. The application program 155 can also extract the filters 140 and related details about the study. If the application 155 needs to look at monitored links 125 configured at a particular time then the date/time can be used to extract the appropriate link 125 configuration as well. With the aid of the study ID 405 and start and stop times 410,415 as keys, a user can extract all the configuration information related to a filter and thus relate CDRs belonging to the same filter and differentiate CDRs belonging to different filters.

In another mode, each CDR loaded into the CDR database 150 is tagged with the current class ID of the filter(s) which selected that CDR. When the application program 155 accesses the CDR in the CDR database 150, the application program 155 can determine the context of the CDR by first selecting those entries in the Study Table 400 having the tagged class ID 305 and second by selecting from this set the entry whose start time 410 and stop time 415 embrace a timestamp value in the CDR. Only one table entry should result because no two filters have the same class ID at any one time.

The configuration tracking module 165 creates the Study Table 400 by remembering the last-known state of filtering for each class ID 305 as well as monitoring for any filter criteria 140 changes. When a filtering 140 change is detected on a particular class ID 305, the study ID 405 actively associated with that class ID 304 is "closed" and a new study ID 405 is "opened" and associated with the new class ID 305. Furthermore, the configuration tracking module 165 makes a record in the CDR database 150 of the current state of filter criteria 140, for the class ID 305, and associates this state with the newly opened study ID 405. Subsequently, all CDRs collected, as a result of the new filter, are tagged with the newly opened study ID 405. As a result, any CDR processing application, such as application program 155, which is evaluating a particular CDR, can derive the context under which the CDR has been collected.

Figure 5:
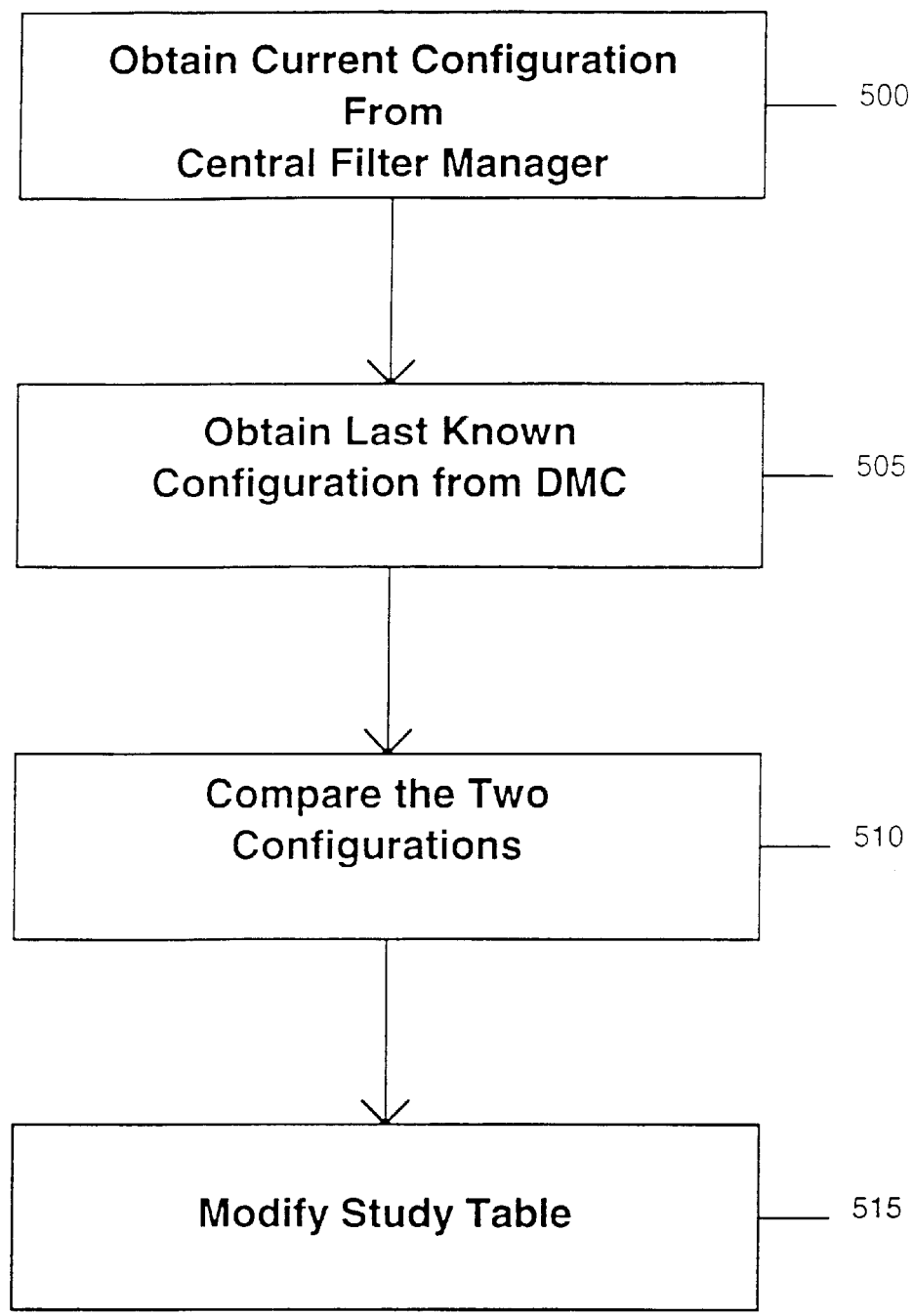
FIG. 5 is a flow chart of a configuration tracking method.

Referring to FIG. 5, there are at least three major tasks the configuration tracking module 165 performs to ascertain if there has been a filter change. Initially, the configuration tracking module 165 obtains the current filter definitions from the filter manager 160. Second, the configuration tracking module 165 obtains the last know filter definitions from the data manager 145. Finally, the module 165 compares the current and prior filter definitions. Following is just one example of how the configuration tracking system 165 creates the Study Table 400.

To define or active a filter, a user will enter the particular filter definition to the filter manager 160. The user will typically also select a class ID 305 for this new filter criteria 310, although it is possible that the filter manager 160 could automatically pick a currently unused class ID randomly or according to some predetermined selection schedule. For example, in a typical case, a user enters a new filter criteria of "410, 333" with a class ID=5. The filter manager 160 sends the probes 135 the new filter criteria and concurrently notifies the configuration tracking module 165, via a change notification signal, that a new filter criteria has been entered. Upon receiving this information, the configuration tracking module 165 asks the filter manager 160 to send the module 165 a current set of all the filter definitions 140 along with the assigned class IDs. In addition, the configuration tracking module 165 notes the time when it was notified of the filter change. The current set of the filter definition is then saved in memory by the data manager 145.

Next, the configuration tracking module 165 obtains from the data manager 145 the last known filter configuration saved in memory. All prior filter criteria are stored in the data manager 150 in the form of a Study Table 400. For example, if the new filter criteria of "410, 333" was entered into the filter manager 160 at 12:00 PM on Jan. 1, 1999, then the configuration tracking module 165 will ask the data manager 145 for all open filter definitions prior to this day and time. This prior set of filter definition is then saved in memory by the data manager 145.

The two filter definitions, the current set and the prior set, are then compared. The configuration tracking module 165 compares each class ID 305 and its corresponding filter criteria of the current filter set with that of the prior filter set. For example, when the module 165 compares current class ID 5 with a filter definition "410, 333" with prior class ID 5 with a filter definition 310 and notices the difference in filter criteria, the module 165 will then go to the Study Table 400 in the CDR database 145 and find the prior filter definition 310 and place a stop time 415 of 12:00 PM. In addition, the configuration tracking module 165 will create a new study ID 405 and give that new study ID 405 the new filter criteria "410, 333" and a start time 410 of 12:00 p.m. For those class IDs 305 for which there was no filter criteria change, the study ID 405 and filter criteria 310 will remain open.

Alternatively, the configuration tracking module 165 may become aware of filtering changes by polling the filter manager 160. In this case, the configuration tracking module 165 periodically transmits a polling message to the filter manager 160. In response to the polling message, the filter manager 160 transmits to the configuration tracking module 165 a copy of the Filter Table 300. According to one variation of this polling scheme, the filter manager 160, in response to the polling message, determines whether filter definitions have been changed in the Filter Table 300 since the last polling message, and transmits a copy of the Filter Table 300 only if there has been a change.

Unlike filter configuration changes, link changes do not affect the opening and closing of study IDs 405. This is due to the fact that studies and CDRs are associated with the Link Lookup Table 200 by time. To find out what links were being monitored for a CDR the user would query the Link Lookup Table 200 looking for links that were opened at the time indicated.

The terms and descriptions used herein are set forth by way of illustration only and are not meant as limitations. In particular, although the invention has been described with reference to specific data structures, the invention may work equally well with variations of the data structure having more or less fields. Further, although the invention has been described with reference to specific ordered processing steps, the invention is operable with the steps performed in different orders or simultaneously. Those skilled in the art will recognize that these are other variations are possible within the spirit and scope of the invention as defined in the following claims.

What is claimed is:

1. A method for configuration tracking comprising:
   (a) determining a first configuration for a set of CDR filters;
   (b) determining a second configuration for the set of CDR filters;
   (c) comparing the first configuration and the second configuration; and
   (d) constructing a study table that contains a historical record of filter criteria, including a study ID, a start time, and a stop time for each filter criterion.

2. The method of claim 1 wherein the second configuration is earlier in time than the first configuration.

3. The method of claim 1 further comprising:
   (e) generating CDRs;
   (f) filtering the CDRs according to the first configuration for the set of CDR filters; and
   (g) filtering the CDRs according to the second configuration for the set of CDR filters.

4. The method of claim 3 wherein generating CDRs comprises probing signaling links.

5. The method of claim 4 wherein the signaling links are SS7 links.

6. The method of claim 3 further comprising storing the filtered CDRs.

7. The method of claim 3 further comprising processing the filtered CDRs.

8. The method of claim 1 wherein the set of CDR filters is 64 filters.

9. The method of claim 1 wherein the first configuration for the set of CDR filters is described by a first table containing a set of filter criteria, the second configuration for the set of CDR filters is described by a second table containing a set of filter criteria, and the step of comparing comprises comparing the first table and the second table.

10. The method of claim 9 further comprising:
constructing a third table, wherein each record of the third table comprises a filter criterion, a start time, and a stop time that is possibly blank; and modifying the third table in response to the comparing step as follows:
if the second table contains a filter definition not present in the first table, then creating a new entry in the third table, said entry having the same filter definition, a start time, and a blank stop time;
if the third table contains a filter definition not present in the first table and a stop time corresponding to said filter definition is blank, then overwriting the blank stop time with a stop time value; and
if the first table and the second table contain the same filter definition, then not modifying a record having the same filter definition in the third table.

11. The method of claim 1 wherein determining a first configuration for a set of CDR filters comprises:
(a) receiving a change notification signal; and
(b) extracting the first configuration in response to the change notification signal.

12. The method of claim 1 wherein determining a first configuration for a set of CDR filters comprises:
(a) transmitting a polling signal; and
(b) receiving the first configuration in response to the polling signal.

13. The method of claim 1 further comprising:
storing the first configuration and wherein determining a second configuration comprises retrieving the first configuration.

14. A system for configuration tracking comprising:
(a) at least one table containing N CDR filtering criteria assosciated with a particular class ID, wherein the filtering criteria may be dynamically modified;
(b) a study table containing a historical record of filter criteria, including a study ID, a start time, and a stop time for each filter criteria;
(c) a configuration tracking module that produces the study table on the basis of the at least one table containing N CDR filter criteria.

15. The system of claim 14 further comprising:
(d) one or more signaling link probes that gather CDRs;
(e) N CDR filters; and
(f) a database containing selected gathered CDRs, wherein the selected CDRs are selected by the CDR filters.

16. The system of claim 15 wherein the signaling link probes are SS7 link probes.

17. The system of claim 14 wherein N=64.

18. The system of claim 14 further comprising:
one or more application modules that access the study table.

19. A method for configuration tracking, comprising:
determining a first configuration for at least one CDR filter;
determining a second configuration for at least one CDR filter;
comparing the first configuration and the second configuration, wherein the first configuration of the at least one CDR filter is described by a first table containing a set of filter criterion, wherein the second configuration for the at least one CDR filter is described by a second table containing at least one filter criterion, and the step of comparing comprises comparing the first table and the second table;
constructing a third table, wherein each record of the third table comprises a filter criterion, a start time, and a stop time that is possibly blank; and
modifying the third table in response to the comparing step as follows:
if the second table contains a filter definition not present in the second table, then creating a new entry in the third table, said entry having the same filter definition, a start time, and a blank stop time;
if the third table contains a filter definition not present in the first table and a stop time corresponding to said filter definition is blank, then overwriting the blank stop time with a stop time value; and
if the first table and the second table contain the same filter definition, then not modifying a record having the same filter definition in the third table.

20. A method for configuration tracking, comprising:
determining a first configuration for at least one CDR filter;
determining a second configuration for at least one CDR filter;
constructing at least one table containing at least one CDR filtering criteria, wherein the filtering criteria may be dynamically modified;
comparing the first configuration and the second configuration; and
constructing a study table that contains a historical record of filter criteria, including a study ID, a start time, and a stop time for each filter criterion.

* * * * *